US010131568B2

(12) United States Patent
Nguyen et al.

(10) Patent No.: US 10,131,568 B2
(45) Date of Patent: Nov. 20, 2018

(54) MANUFACTURING PROCESS FOR STRIAE-FREE MULTICOMPONENT CHALCOGENIDE GLASSES VIA MULTIPLE FINING STEPS

(71) Applicant: The United States of America, as represented by the Secretary of the Navy, Washington, DC (US)

(72) Inventors: Vinh Q. Nguyen, Fairfax, VA (US); Mikhail Kotov, Silver Spring, MD (US); Daniel J. Gibson, Cheverly, MD (US); Shyam S. Bayya, Ashburn, VA (US); Jasbinder S. Sanghera, Ashburn, VA (US); Gryphon A. Drake, Potomac, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 96 days.

(21) Appl. No.: 15/059,637

(22) Filed: Mar. 3, 2016

(65) Prior Publication Data
US 2016/0257593 A1 Sep. 8, 2016

Related U.S. Application Data

(60) Provisional application No. 62/127,305, filed on Mar. 3, 2015.

(51) Int. Cl.
*C03B 5/235* (2006.01)
*C03C 3/32* (2006.01)
*C03B 5/187* (2006.01)
*C03B 5/06* (2006.01)

(52) U.S. Cl.
CPC ............... *C03C 3/321* (2013.01); *C03B 5/06* (2013.01); *C03B 2201/86* (2013.01)

(58) Field of Classification Search
CPC combination set(s) only.
See application file for complete search history.

(56) References Cited

U.S. PATENT DOCUMENTS

| 9,708,210 | B2 * | 7/2017 | Nguyen | .................. C03C 3/321 |
| 2015/0344342 | A1 * | 12/2015 | Nguyen | .................. C03C 3/321 |
| | | | | 501/40 |
| 2016/0280587 | A1 * | 9/2016 | Aitken | .................... C03C 3/321 |

OTHER PUBLICATIONS

Sanghera et al. "Development of Law Loss IR Transmitting Chalcogenide Glass Fibers," SPIE vol. 2396 (1995) 71-77.

* cited by examiner

*Primary Examiner* — Jason L Lazorcik
(74) *Attorney, Agent, or Firm* — US Naval Research Laboratory; Rebecca L. Forman (57) ABSTRACT

The present invention provides a method for synthesizing high optical quality multicomponent chalcogenide glasses without refractive index perturbations due to striae, phase separation or crystal formation using a two-zone furnace and multiple fining steps. The top and bottom zones are initially heated to the same temperature, and then a temperature gradient is created between the top zone and the bottom zone. The fining and cooling phase is divided into multiple steps with multiple temperature holds.

9 Claims, 10 Drawing Sheets

FIG. 1

PRIOR ART

FIG. 2

PRIOR ART

FIG. 3A

PRIOR ART

FIG. 3B

PRIOR ART

FIG. 4A

PRIOR ART

FIG. 4B

PRIOR ART

FIG. 5A

PRIOR ART

FIG. 5B

PRIOR ART

PRIOR ART

FIG. 10A          FIG. 10B          FIG. 10C

MANUFACTURING PROCESS FOR STRIAE-FREE MULTICOMPONENT CHALCOGENIDE GLASSES VIA MULTIPLE FINING STEPS

PRIORITY CLAIM

The present application is a non-provisional application claiming the benefit of U.S. Provisional Application No. 62/127,305, filed on Mar. 3, 2015 by Vinh Q. Nguyen et al., entitled "MANUFACTURING PROCESS FOR STRIAE-FREE MULTICOMPONENT CHALCOGENIDE GLASSES VIA MULTIPLE FINING STEPS," the entire contents of which is incorporated herein by reference.

BACKGROUND OF THE INVENTION

Field of the Invention

The present invention relates making striae-free multicomponent chalcogenide glasses with uniform refractive index.

Description of the Prior Art

Chalcogenide glasses comprise at least one chalcogen element (S, Se or Te) and other elements including, but not limited to, Ge, As, Ga, Sn, Sb and transmit infrared light (IR) from between about 1 μm to about 12 μm or greater, depending on composition. The infrared transmitting chalcogenide glasses and optical fibers encompass the IR region of interest with numerous applications including thermal imaging, temperature monitoring, and medical applications. Also, chalcogenide glass fibers may be developed for IR missile warning systems and laser threat warning systems to provide superior aircraft survivability, and high energy IR power delivery using for example, but not limited to, CO (5.4 μm) and $CO_2$ (10.6 μm) lasers (Sanghera et al., "IR fiber optics development at the Naval Research Laboratory," SPIE, 3950, 180-185 (2000) and Sanghera et al., "Applications of Chalcogenide Glass Optical Fibers at NRL," J. Optoelectronics and Advanced Materials 3 (3), 627-460 (2001)). In addition, these fibers may be developed for remote fiber optic chemical sensor systems for military facility clean-up and other industrial applications. High quality infrared transmitting optical fibers enable applications in remote chemical sensors to detect contaminants in groundwater, environmental pollution monitoring, Raman amplifiers, optical ultra-fast switches for telecommunications, fiber sources in the infrared for sensors, biomedical surgery and tissue diagnostics, and other civil/industrial process monitoring applications. Chalcogenide glasses may also be used as bulk optical elements, including windows, lenses, prisms, beam splitters and the like, and must have high compositional uniformity and homogeneity in order to maintain accurate control of light rays passing through the glass and to achieve satisfactory optical results.

Chalcogenide glasses based on arsenic and sulfur may be developed for use in many defense applications including high energy IR laser power delivery for infrared countermeasures and chemical sensors for facility clean up. The properties of the chalcogenide-based glasses, including optical, physical and thermal properties, such as refractive index, dispersion, thermo-optic coefficient, glass transition temperature, viscosity profile, hardness, fracture toughness, thermal expansion, density, nonlinear index, fluorescence and others, can be tailored through composition. However, some chalcogenide glass compositions with technologically useful properties may be thermodynamically unstable whereby crystallites or other inhomogeneities, including phase-separated glassy regions or devitrified regions, form within the glass during synthesis, melting or processing. When synthesized using the methods of prior art, this thermodynamic instability limits the physical size of the glass that may be fabricated (such as $Ge_{30}As_{22}Se_{23}Te_{25}$), and in some cases optical quality glass may not be made in any size due to crystal formation (such as $Ge_{13}As_{32}Se_{25}Te_{30}$) (Kokorina, Glasses for Infrared Optics, CRC Press, Inc. (1996)). It is well-known in the art of glass making that thermodynamically unstable glasses can be synthesized by rapidly cooling the melt, but the glasses are not optical quality due to striations that form upon rapid cooling.

The prior art methods to synthesize a chalcogenide glass from a melt are demonstrated here by example.

EXAMPLE 1

Prior Art Process to Make $Ge_xAs_yS_{(100-x-y-z)}Se_z$ Glasses

Figure 1:
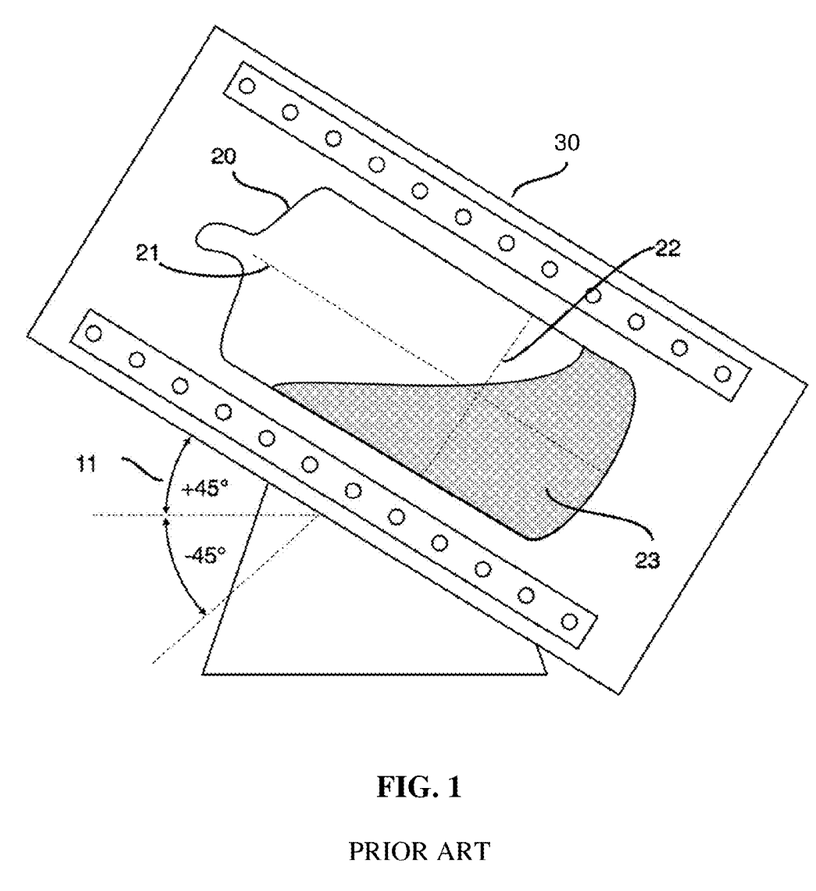
FIG. 1 is a schematic overview of a prior art process to synthesize chalcogenide glasses by melt processing.

First, germanium, arsenic, sulfur, and selenium precursors sufficient to constitute a glass with the composition of x % at. Ge, y % at. As, z % at. Se, and (100-x-y-z) % at. S, where (0≤x≤10, 0≤z≤10 and 30≤x+y≤45) are loaded in a silica ampoule under an inert (e.g. Ar or nitrogen gas) atmosphere. As shown in FIG. 1, the ampoule 20 is cylindrical in shape and has an axis 21 and a diameter 22. The ampoule 20 is connected to a vacuum pump and evacuated for 4 hours at about $1 \times 10^{-5}$ Torr. The ampoule 20 shown in this example has a length, parallel to its axis 21, that is longer than the diameter 22, which is perpendicular to the axis 21, but the ampoule 20 is not limited to this geometry and may have a diameter greater than its length, as is useful for casting large diameter glass for large optics. The ampoule 20 containing $Ge_xAs_yS_{(100-x-y-z)}Se_z$ glass melt precursors 23 is sealed using a methane (or hydrogen)/oxygen torch and placed inside a rocking furnace 30 with a ±45° angle of inclination 11 where it is heated and rocked according to a glass melting schedule, an example of which is shown in Table 1 (Sanghera et al., "Development of Low-Loss IR Transmitting Chalcogenide Glass Fibers," SPIE vol. 2396, 71-77 (1995)). In Step 1, the top and bottom zones of the furnace are heated at a rate of 3° C./min from 20° C. (room temperature) to 750° C. The furnace then remains at 750° C. for 10 hours and is actively rocked at an inclination angle of ±45° to facilitate mixing and homogenization of the elemental components.

Figure 2:
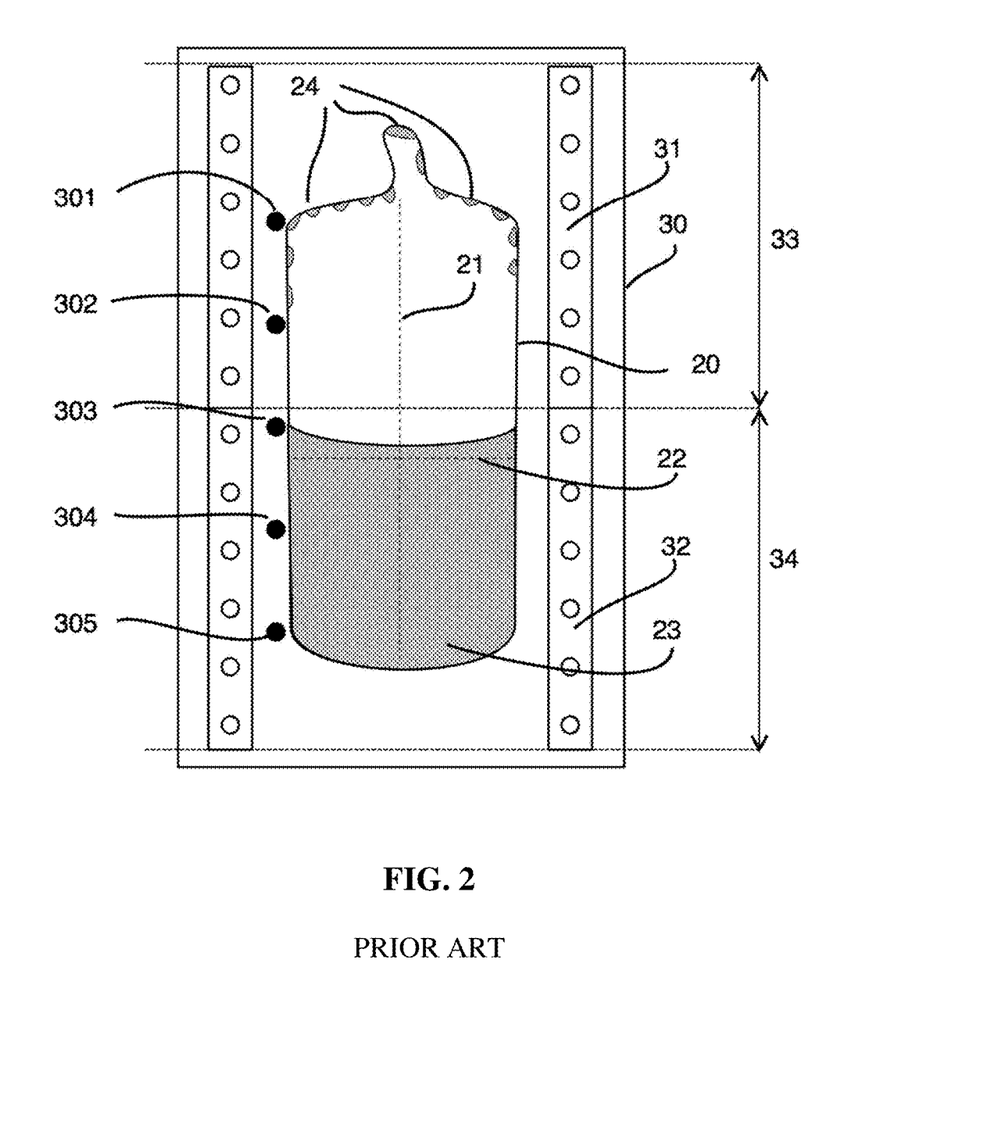
FIG. 2 is a schematic overview of a rocking furnace in vertical (90°) fixed position of a prior art process.

In Step 2, the furnace motion is stopped and the furnace is set to a vertical position (90° fixed angle, such that the axis of the ampoule is vertically aligned) and held at temperature (750° C.) for 1 hour to facilitate fining and settling of the glass melt. At this stage, the ampoule is also set up in the 90° vertical position parallel to the furnace (FIG. 2).

In Step 3, the temperatures of both zones are reduced at a rate of 5° C./min to 440° C. and the temperature is held at 440° C. for 2 hrs. As shown in FIG. 2, temperatures are measured at various points 301, 302, 303, 304, 305 along the length of the ampoule 20 containing $Ge_xAs_yS_{100-x-y-z}Se_z$ glass melt 23 immediately prior to glass quenching. In this example, the heater 31 in the top zone 33 and the heater 32 in the bottom zone 34 are set to the same temperature (440° C.), and beads of condensed glass 24 are seen to form at the top of the ampoule 20. The measured temperatures were as follows: $T_{301}$=430° C., $T_{302}$=435° C., $T_{303}$=438° C., $T_{304}$=441° C., and $T_{305}$=442° C.

In Step 4, the hot ampoule is removed from the furnace and submerged in a room temperature water bath for 30 seconds to quench the glass, and is then placed in another furnace at 196° C. for 10 hours to anneal the solid glass followed by slow cooling to room temperature at 1.0 C/min.

TABLE 1

Example of a prior art glass melting schedule for $Ge_xAs_yS_{(100-x-y-z)}Se_z$ glass compositions in a two-zone furnace.

| Step | Heating Rate (° C./min) | Temperature (° C.) Top Zone | Temperature (° C.) Bottom Zone | Dwell (hours) | Furnace Position |
|---|---|---|---|---|---|
| 1 | 3 | 750 | 750 | 10 | Rocking at ±45° inclination |
| 2 | — | 750 | 750 | 1 | Vertical 90° fixed. Fining. |
| 3 | −5 | 440 | 440 | 2 | Vertical 90° fixed. Fining. |
| 4 | | | Water quench | | |

Figure 3A:
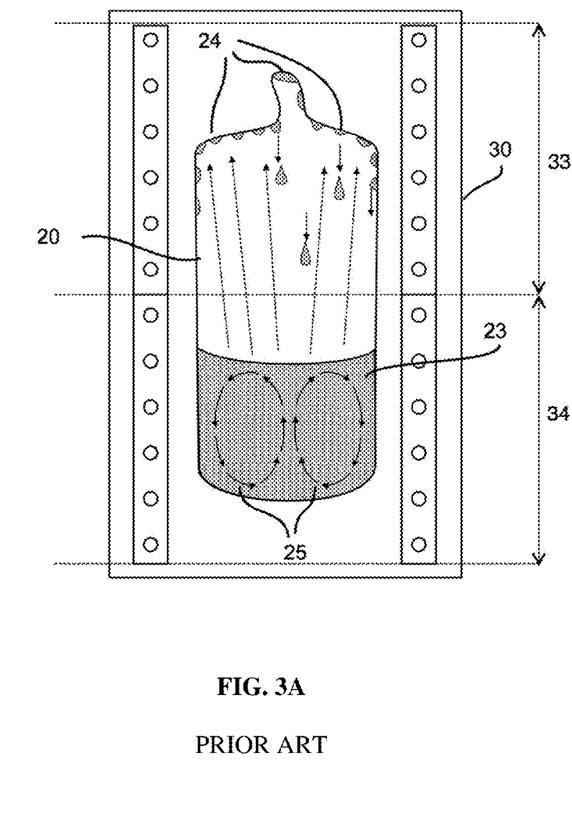
FIG. 3A is a schematic diagram of thermal convection current in the Ge$_x$As$_y$S$_{(100-x-y-z)}$Se$_z$ glass melt and glass condensation drops on top of the cooler ampoule inside the furnace of a prior art process.
Figure 3B:
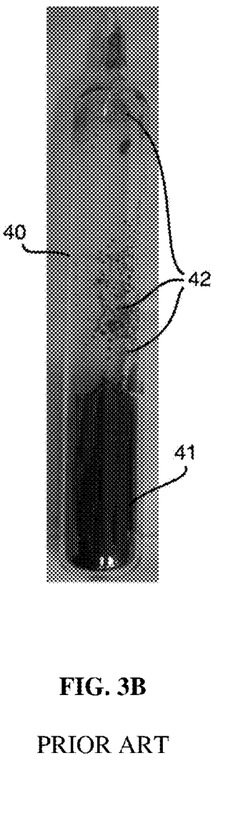
FIG. 3B is a photo of said ampoule after quenching with glass condensation above the solid glass.

In Step 3 of the prior art process, although the top and bottom zones of the furnace are both set at the same temperature (440° C. in the example) the actual measured temperature along the length of the ampoule containing the glass melt may vary. A temperature gradient (ΔT) of 12° C. was measured in the example and is due largely to convection heat loss through the top of the furnace. FIG. 3A shows a diagram of thermal convection current 25 in the $Ge_xAs_yS_{(100-x-y-z)}Se_z$ glass melt 23 and glass condensation drops 24 on top of the cooler ampoule 20 inside the furnace 30. FIG. 3B shows a photo of an ampoule 40 after quenching with glass condensation 42 above the solid glass 41. The effect of convection heat loss causes thermal convection currents within the bulk glass, resulting in the condensation of glass beads above the melt at the cooler section of the ampoule which then drip back into the melt. These condensation beads may have a different composition than the rest of the glass melt and this continual mass fluxing cycle can cause a compositional non-uniformity throughout the entire melt. Furthermore, as the glass cools during Step 3, the composition of the glass near the surface is changing as condensation of gaseous components (e.g. sulfur) from the closed system settle on the surface of the glass melt. Thermal convection currents within the glass are present during cooling and allow this surface glass, with a slightly different composition, to become reincorporated into the bulk glass. The convection currents or swirls are not sufficient to thoroughly distribute or homogenize the glass, resulting in compositional gradients within the glass.

Figure 4A:
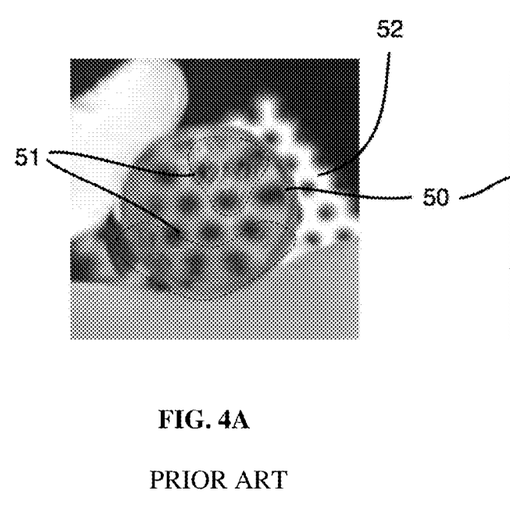
FIG. 4A is an IR-image of a hot steel grating viewed through a 1 inch diameter, 4.0 inches thick cylinder (both faces polished) of Ge$_x$As$_y$S$_{(100-x-y-z)}$Se$_z$ glass showing striae in the bulk glass.
Figure 4B:
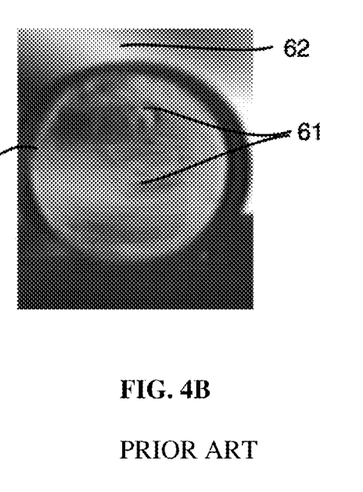
FIG. 4B is an IR-image of a human hand and fingers viewed through a 1 inch diameter, 4.0 inches thick cylinder (both faces polished) of Ge$_x$As$_y$S$_{(100-x-y-z)}$Se$_z$ glass showing striae in the bulk glass.

During water quenching of Step 4, the viscosity of the glass increases as the glass melt cools and the compositional gradients become frozen resulting in striae in the bulk glass. Consequently, there are refractive index perturbations in the striae-containing glass that degrade the optical quality of the glass and fiber made from this glass. FIG. 4A shows an IR-image of a hot steel grating viewed through a 1 inch diameter, 4.0 inches thick cylinder (both faces polished) of $Ge_xAs_yS_{(100-x-y-z)}Se_z$ glass of this example and reveals the presence of striae and refractive index perturbations within the glass. FIG. 4B show an IR-image of a human hand and fingers viewed through a 1 inch diameter, 4.0 inches thick cylinder (both faces polished) of $Ge_xAs_yS_{(100-x-y-z)}Se_z$ glass of this example and reveals the presence of striae and refractive index perturbations within the glass.

EXAMPLE 2

Prior Art Process to Make Striae-Free $As_{39}S_{61}$ Glasses

Nguyen et al., in another invention, teach a method to synthesize striae-free arsenic sulfide-based chalcogenide glass ($As_{39}S_{61}$) and other chalcogenide glasses (Nguyen et al., US 2015/0344342 (Dec. 3, 2015)). In that invention, a furnace with an upper zone and a lower zone is used for rocking and fining of the glass melt and the temperature of the upper zone is hotter than the lower zone by 100° C. during all steps of the melting schedule, shown here in Table 2. The main feature of the prior art method employed by Nguyen et al. is that the temperature of the top zone in the fining and cooling steps (steps 3 & 4) is set to a higher temperature than the bottom zone by 100° C., which has two benefits: 1) convection currents within the glass melt are reduced and 2) condensation and mass fluxing within the glass melt are prevented. This temperature gradient eliminates the main causes of striae and therefore reduces compositional variations in the molten glass.

TABLE 2

Glass melting schedule for striae-free $As_{39}S_{61}$ glass in a two-zone furnace using the invention in Ref 4.

| Step | Heating Rate (° C./min) | Temperature (° C.) Top Zone | Temperature (° C.) Bottom Zone | Dwell (hours) | Furnace Position |
|---|---|---|---|---|---|
| 1 | 3 | 850 | 750 | 1 | Horizontal 0° fixed |
| 2 | — | 850 | 750 | 10 | Rocking at ±45° inclination |
| 3 | −1 | 800 | 700 | 24 | Vertical 90° fixed |
| 4 | −0.6 | 360 | 260 | 12 | Vertical 90° fixed |
| 5 | | | Water quench | | |

Figure 5A:
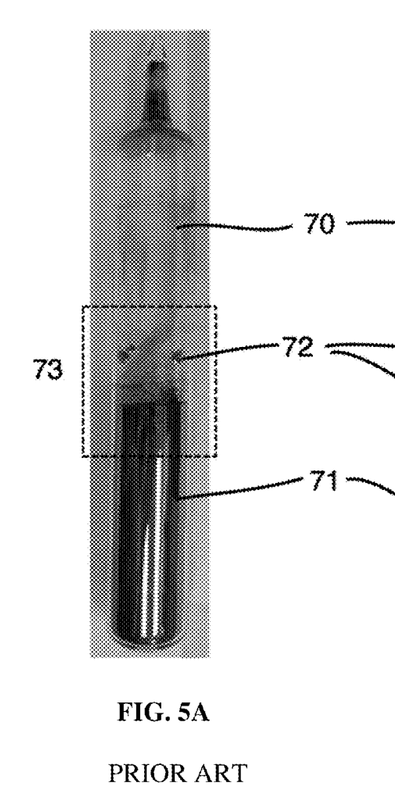
FIG. 5A shows an ampoule containing a Ge$_x$As$_y$S$_{(100-x-y-z)}$Se glass made by a prior art process, where $0 \leq x \leq 10$, $0 \leq z \leq 10$ and $30 \leq x+y \leq 45$, showing crystals above the glass.
Figure 5B:
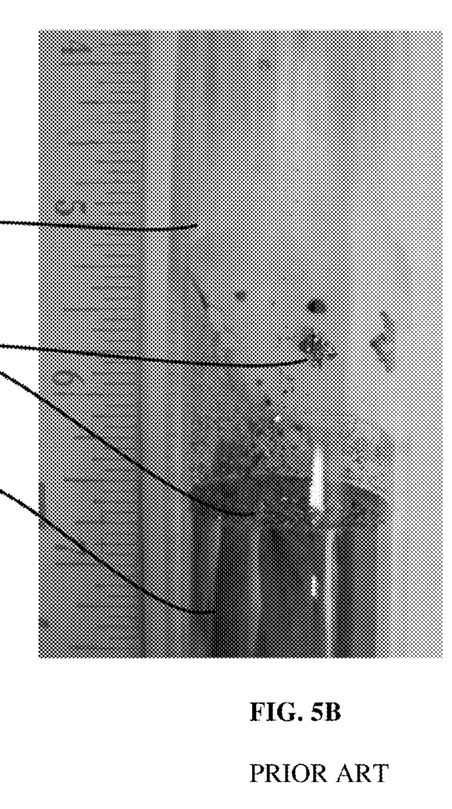
FIG. 5B shows an enlargement of area 73 from FIG. 5A.

This method, which was demonstrated with arsenic-sulfide binary glasses, does not work with all multicomponent glasses, an example of which is $Ge_xAs_yS_{(100-x-y-z)}Se_z$, glass due to the potential formation of intermediate phases upon cooling, including crystals, nuclei, and phase separated immiscible glasses, due to slow cooling. FIGS. 5A and 5B show a $Ge_xAs_yS_{(100-x-y-z)}Se_z$ glass, $0 \leq x \leq 10$, $0 \leq z \leq 10$ and $30 \leq x+y \leq 45$ that was fabricated using this method; crystal precipitates can be seen above and in the glass. FIG. 5A shows an ampoule 70 containing the $Ge_xAs_yS_{(100-x-y-z)}Se$ glass 71 made by this method and crystals 72 above the glass. FIG. 5B is an enlargement of area 73.

BRIEF SUMMARY OF THE INVENTION

The aforementioned problems are overcome in the present invention which provides high optical quality multicomponent chalcogenide glasses without refractive index perturbations due to striae, phase separation or crystal formation using a two-zone furnace and multiple fining steps. The top and bottom zones are initially heated to the same temperature, and then a temperature gradient of about 100° C. is created between the top zone and the bottom zone. The fining and cooling phase is divided into multiple steps with multiple temperature holds.

The present invention enables synthesis of homogeneous, optical quality glasses for some glass compositions that are not possible using methods of the prior art. The chalcogenide glasses and fibers described herein, and more specifically glasses and fibers containing primarily arsenic, sulfur, selenium, tellurium, germanium with dopants including antimony, gallium aluminum, indium, bismuth, tin, iodine, bromine, chlorine, fluorine, lanthanum and other elements up to about 10%at each, may be synthesized according to the method of the present invention in forms suitable for optical quality fibers and geometric optics including windows, lenses and other devices.

The process of the present invention has the following advantages over the process of the prior art:

Fast cooling rate and shorter overall processing time prevent formation of intermediate phases, including precipitated crystals, during cooling of the glass melt.

Thermal convection heat loss, convection current and mass flux are eliminated within the bulk molten glass by setting the temperature of the top zone approximately 100° C. higher than the bottom zone through all steps of the cooling process.

Controlled cooling with multiple temperature hold steps allow the entire volume of the glass melt to reach the same temperature, or thereabouts, and prevents the formation of convection currents within the glass melt during the entire cooling phase of the process. This contributes to a striae-free, lower energy, and stable state of the glass melt just before quenching.

Uniform composition and the absence of crystals, nuclei, and striae in the bulk glass eliminate refractive index perturbations enabling glass with higher optical quality for high-performance IR fibers and refractive optical elements.

These and other features and advantages of the invention, as well as the invention itself, will become better understood by reference to the following detailed description, appended claims, and accompanying drawings.

DETAILED DESCRIPTION OF THE INVENTION

The present invention provides a new method to synthesize striae-free chalcogenide glass using melt processing. High optical quality multicomponent chalcogenide glasses without refractive index perturbations due to striae, phase separation or crystal formation are synthesized using a two-zone furnace and multiple fining steps. The top and bottom zones are initially heated to the same temperature, and then a temperature gradient of about 100° C. is created between the top zone (750° C.) and the bottom zone (650° C.). The fining and cooling phase is divided into multiple steps with multiple temperature holds. The glass melt is fined for 3 hours at high temperature—above the temperature at which crystal precipitation is known to begin—and then rapidly cooled to a lower temperature below the temperature at which crystal precipitation occurs where it is held for 3 hours. The glass melt is then cooled and held at another lower temperature for 3 more hours.

The method of the present invention to synthesize striae-free chalcogenide glass using melt processing is described herein by example using Ge$_x$As$_y$S$_{(100-x-y-z)}$Se$_z$ glass.

EXAMPLE 3

Figure 6:
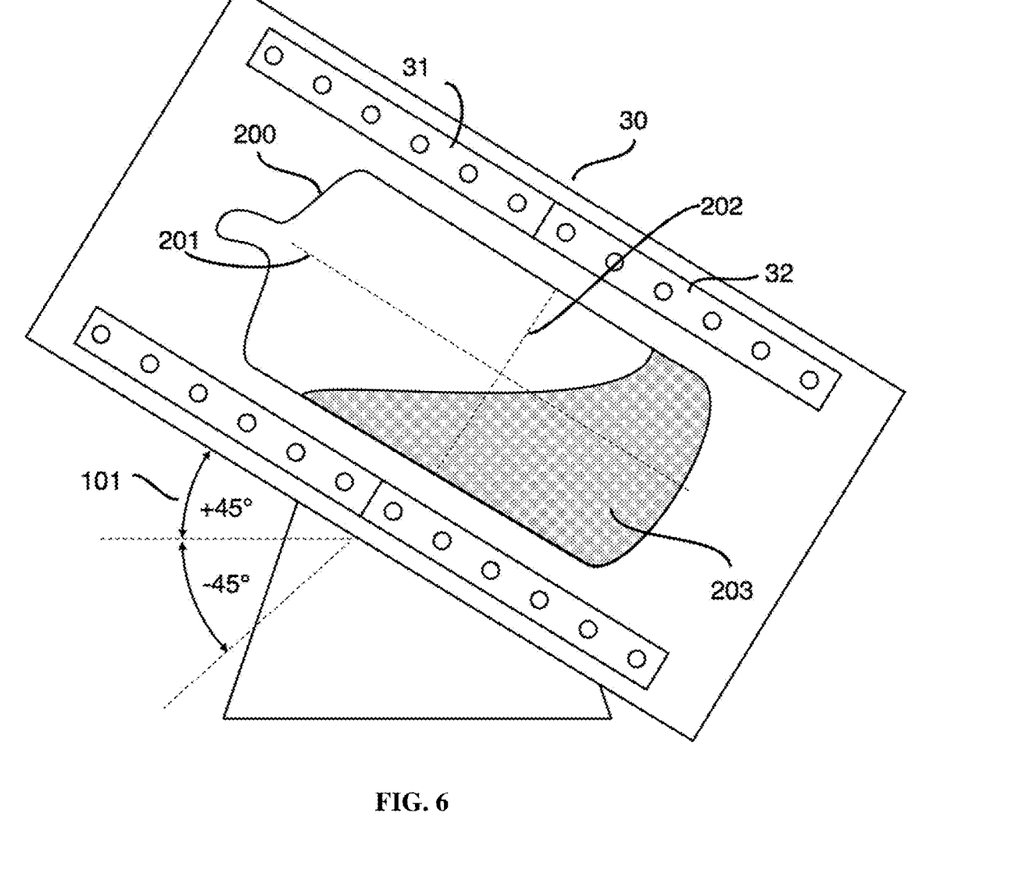
FIG. 6 is a schematic overview of a furnace used in the current invention to synthesize chalcogenide glasses by melt processing.

Process of the Present Invention to Make Striae-Free $Ge_xAs_yS_{(100-x-y-z)}Se_z$ and Other Multicomponent Chalcogenide Glasses Germanium, arsenic, sulfur, and selenium precursors sufficient to constitute a glass with the composition of x % at. Ge, y % at. As, z % at. Se and (100-x-y-z) % at. S, where ($0 \leq x \leq 10$, $0 \leq z \leq 10$ and $30 \leq x+y \leq 45$) are loaded in a silica ampoule under an inert nitrogen gas atmosphere. FIG. 6 shows a schematic overview of the furnace used in the present invention to synthesize chalcogenide glasses by melt processing comprising a sealed quartz ampoule 200 containing melted $Ge_xAs_yS_{(100-x-y-z)}Se_z$ precursors 203 inside a rocking furnace 30 having two independently controllable heaters 31, 32 with a ±45° inclination angle 101. The ampoule 200 is cylindrical in shape and has an axis 201 and a diameter 202, and is then connected to a vacuum pump and evacuated for 4 hours at about $1\times10^{-5}$ Torr. The ampoule has a length, parallel to its axis, and a diameter, perpendicular to the axis, such that the length is greater than the diameter, but the ampoule is not limited to this geometry and may have a diameter greater than its length, as is useful for casting large diameter glass for large optics. Furthermore the ampoule may have another shape similar to the shape of a glass product such as a lens or lens preform used in precision lens molding processes. The ampoule is then sealed using a methane (or hydrogen)/oxygen torch and placed inside a rocking furnace with a ±45° angle of inclination and two independently controllable temperature zones where it is heated and rocked according to a glass melting schedule, an example of which is shown in Table 3. The bottom of the ampoule is placed at the center of the bottom zone where the glass melt is entirely within the bottom zone.

In Step 1, the top and bottom zones of the furnace are heated at a rate of 3° C./min from 20° C. (room temperature) to 680° C. (top) and 680° C. (bottom). In Step 2, the temperatures of the top zone (680° C.) and bottom zone (680° C.) are held constant for 15 hours while the furnace is rocked at an inclination angle of ±45° to facilitate mixing and homogenization of the elemental components. In Step 3, the top zone temperature is increased at a rate of 0.6° C./min to 750° C. and the bottom zone temperature is decreased at a rate of 0.6° C./min to 650° C. while the furnace is rocked at an inclination angle of ±45° to establish the temperature gradient of 100° C. between the top and bottom zones. In Step 4, the furnace motion is stopped and the furnace was set to a vertical position (90° fixed angle). This furnace position and temperature profile were held for 3 hours to facilitate fining and settling of the glass melt. In Step 5, the temperatures of the top zone and the bottom zone are reduced at a rate of 10.0° C./min to 650° C. (top) and 550° C. (bottom) and held for 3 hours. In Step 6, the temperatures of the top zone and the bottom zone are reduced at a rate of 10.0° C./min to 550° C. (top) and 450° C. (bottom) and held for 3 hours. In Step 7, the temperatures of the top zone and the bottom zone are reduced at a rate of 10.0° C./min to 450° C. (top) and 350° C. (bottom) and held for 0.5 hours. In Step 8, the hot ampoule is removed from the furnace, submerged in a room temperature water bath for 9 seconds to quench the glass, and is placed in another furnace at 195° C. for 10 hours to anneal the solid glass.

TABLE 3

Glass melting schedule for a $Ge_xAs_yS_{(100-x-y-z)}Se_z$ glass composition in a two-zone furnace using the present invention.

| Step | Heating Rate (° C./min) | Temperature (° C.) Top Zone | Temperature (° C.) Bottom Zone | Dwell (hours) | Furnace Position |
|---|---|---|---|---|---|
| 1 | 3 | 680 | 680 | 1 | Horizontal 0° fixed |
| 2 | — | 680 | 680 | 15 | Rocking at ±45° inclination |
| 3 | +0.6 (T), −0.6 (B) | 750 | 650 | 1 | Rocking at ±45° inclination |
| 4 | — | 750 | 650 | 3 | Vertical 90° fixed. Fining. |
| 5 | −10.0 | 650 | 550 | 3 | Vertical 90° fixed. Fining. |
| 6 | −10.0 | 550 | 450 | 3 | Vertical 90° fixed. Fining. |
| 7 | −10.0 | 450 | 350 | 0.5 | Vertical 90° fixed. |
| 8 | | | Water quench | | |

In general, the steps in the present invention are similar to steps in the prior art Example 2 to make striae-free 2-component chalcogenide glass ($As_{39}S_{61}$), but the differences described herein enable the fabrication of multicomponent IR-transmitting chalcogenide glasses with improved uniformity and without striae.

Step 1 in the present invention allows for an initial melting of precursor materials prior to rocking for homogenization and reduces the potential of abrasion of the ampoule by solid precursors during the next step. This differs from Step 1 in the prior art of Example 2 in that both furnace zones are set to the same temperature in order to prevent distillation of chemicals from 1 zone to the other via sublimation and condensation.

Steps 2 & 3 encourage mixing and homogenization of the melted material during rocking. In Step 3 of the present invention, a temperature gradient of 100° C. between the top zone (750° C.) and bottom zone (650° C.) is established while the furnace is rocking. This is done in the last hour of the rocking phase so that the gradient is established prior to vertical fining in the next steps. The 100° C. temperature gradient is held throughout the remaining process steps 3-7 in order to 1) reduce convection currents within the glass melt and 2) prevent condensation and mass fluxing within the glass melt. Both phenomena contribute to inhomogeneity and striae in the final glass and are reduced in this invention. This differs from the prior art in Example 2, which establishes and maintains a temperature gradient throughout the entire rocking phase of the process and may contribute to inhomogeneity in multicomponent glass melts.

Steps 4-7 differ from the prior art method in Example 2, in that the fining and cooling phase is divided into multiple steps with multiple temperature holds. In Steps 4-7, the ampoule containing the glass melt is positioned such that the glass melt is largely confined within the bottom zone of the furnace and it is being fined for 3 hours first at high temperature (Step 4) above the temperature at which crystal precipitation (or another phase separation process) is known to begin and then rapidly cooled to a lower temperature safely below (generally 20-200° C. below) the temperature at which crystal precipitation/phase separation occurs where it is held for 3 hours (Step 5) to allow for the volume of glass to reach the same temperature or thereabouts. The glass melt is then cooled and held at another lower temperature for 3 hours (Step 6) to allow for the volume of glass to reach the same temperature or thereabouts and then cooled to the quenching temperature (Step 7). These multiple fining steps (3-7) and a consistent 100° C. higher temperature in the top zone prevent thermal convection within the glass during cooling which allows the uniform conditions in the molten glass established in the previous steps to remain and prevents the reincorporation of surface glass into the bulk glass as in the case of the prior art Examples 1 and 2. The fast cooling rate (10° C./min) and shorter overall processing time prevent formation of intermediate phases including precipitated crystals and crystal nuclei during cooling of the glass melt.

Figure 7:
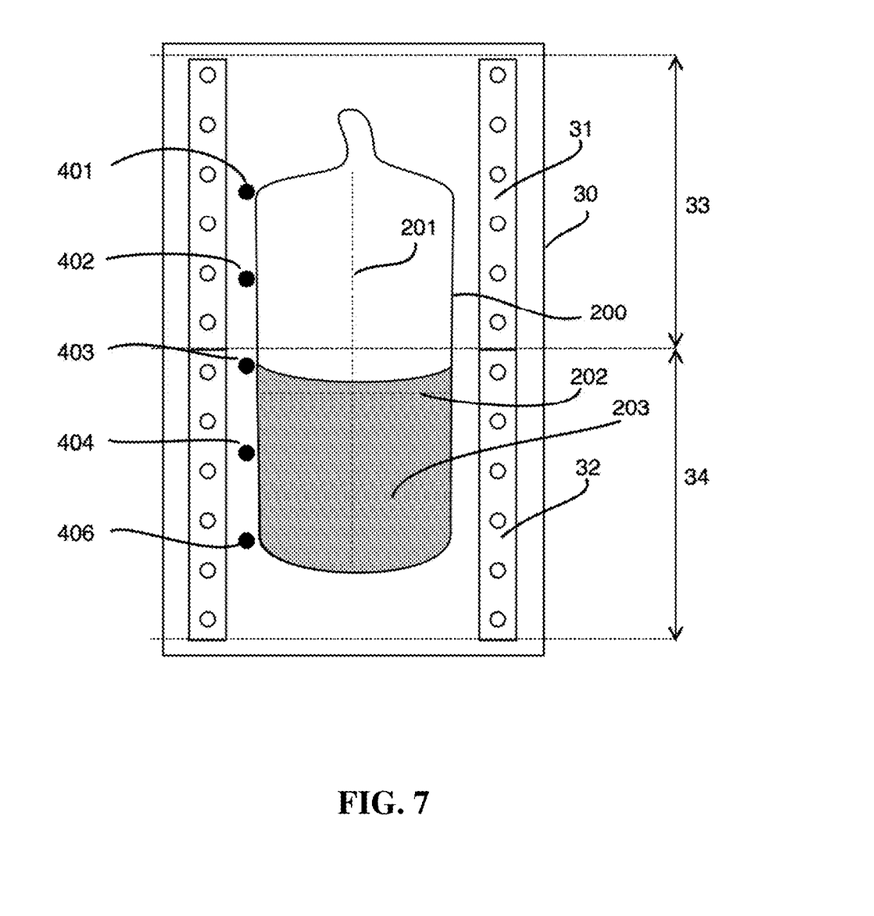
FIG. 7 is a schematic overview of a rocking furnace in vertical (90°) fixed position such that the axis of the ampoule is vertical.

FIG. 7 shows the measuring points 401, 402, 403, 404, 405 in the furnace during the dwell portion of Step 7 in this example. The short dwell steps allow the entire volume of the glass melt to reach the same temperature, or thereabouts, prior to the next cooling step. The temperature was measured various points 401, 402, 403, 404, 405 along the length of the quartz ampoule 200 containing $Ge_xAs_yS_{(100-x-y-z)}Se_z$ glass melt 203. The heater 30 of the top zone 33 was set to 450° C. and the heater 32 of the bottom zone 34 was set to 350° C. in this example. The measured temperatures were as follows: $T_{401}=451°$ C., $T_{402}=450°$ C., $T_{403}=352°$ C., $T_{404}=351°$ C., and $T_{405}=350°$ C.

Figure 8A:
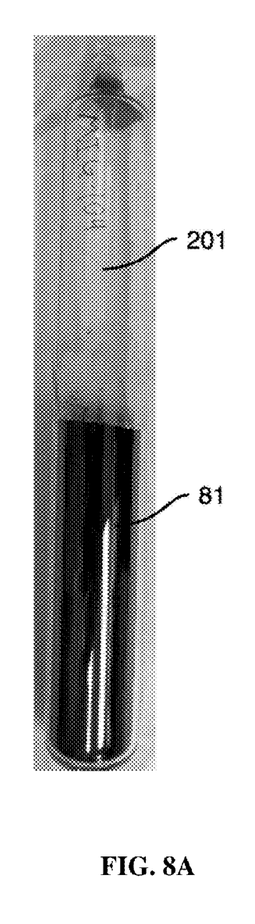
FIG. 8A is a photo of an ampoule with no glass condensation above the glass.
Figure 8B:
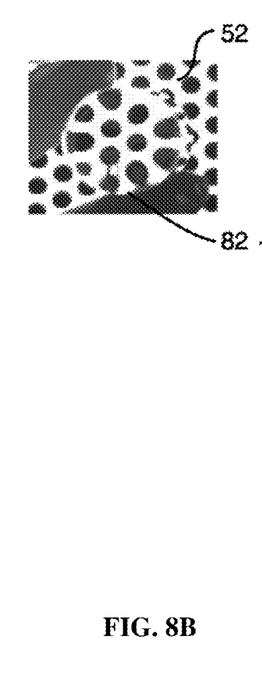
FIG. 8B is an IR-image of a hot steel grating viewed through a 1 inch diameter, 4.0 inches thick Ge$_x$As$_y$S$_{(100-x-y-z)}$Se$_z$ glass cylinder with both faces polished showing no striae in the uniform bulk glass.
Figure 8C:
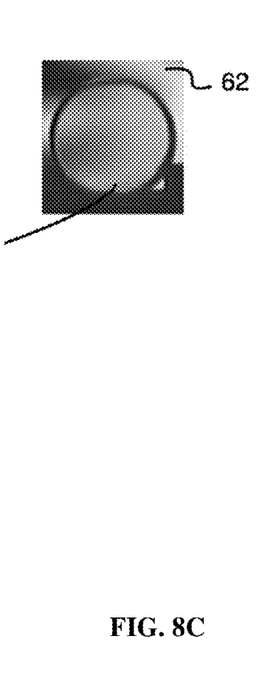
FIG. 8C is an IR-image of a human hand and fingers viewed through a 1 inch diameter, 4.0 inches thick Ge$_x$As$_y$S$_{(100-x-y-z)}$Se$_z$ glass cylinder with both faces polished showing no striae in the uniform bulk glass.

During water quenching of Step 8, the viscosity of the glass increases rapidly as the glass melt cools but thermal stresses are less than those in the method of the prior art due to shorter quench time in the present invention. FIG. 8A shows a photo of a $Ge_xAs_yS_{(100-x-y-z)}Se_z$ glass of the present invention inside an ampoule 201 with no glass condensation or crystal nuclei above the glass melt 81. FIG. 8B shows an IR-image of a hot steel grating 52 viewed through a 1 inch diameter, 4.0 inches thick $Ge_xAs_yS_{(100-x-y-z)}Se_z$ glass cylinder 82 with both faces polished showing no striae in the uniform bulk glass. FIG. 8C shows an IR-image of a human hand and fingers 62 viewed through a 1 inch diameter, 4.0 inches thick cylinder 82 (both faces polished) of a $Ge_xAs_yS_{(100-x-y-z)}Se_z$ glass with no detectable striae, crystallites or refractive index perturbations in the bulk glass.

Figure 9A:
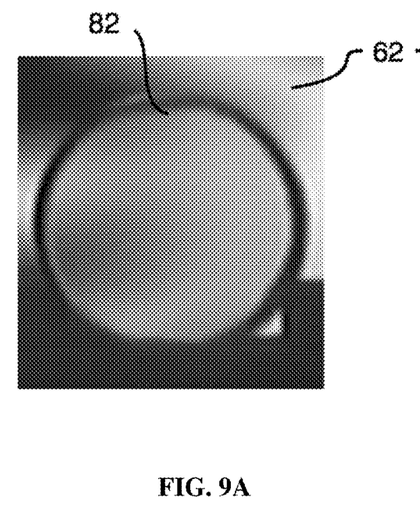
FIG. 9A is an IR image of human hand and fingers viewed through a Ge$_x$As$_y$S$_{(100-x-y-z)}$Se$_z$ glass cylinder produced from the process of the present invention.
Figure 9B:
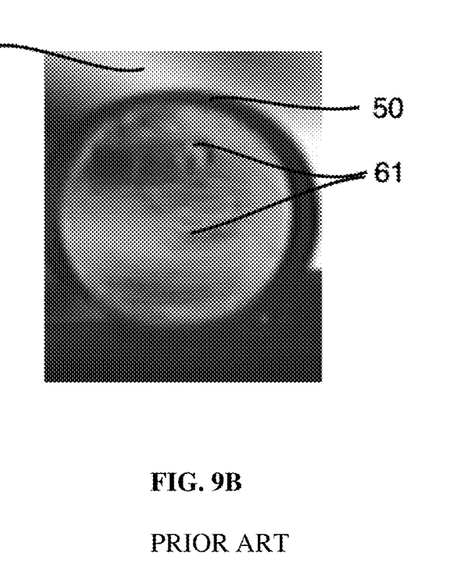
FIG. 9B is an IR image of human hand and fingers viewed through a Ge$_x$As$_y$S$_{(100-x-y-z)}$Se$_z$ glass cylinder produced from a prior art method revealing refractive index perturbations in the art glass of the prior art.

The process of the present invention produces high optical quality multicomponent chalcogenide glasses without refractive index perturbations due to striae, phase separation or crystal formation. Comparing the photographs of the glasses inside the ampoules for the glass made using the prior art method (FIG. 5A) and the glass made using the present invention (FIG. 8A), it is evident that the formation of crystals has been reduced by the present invention. Furthermore, comparing the IR images of the glass prepared using the present invention (FIGS. 8B and 8C) with those of the glass prepared using the prior art methods (FIGS. 4A and 4B) reveals a dramatic improvement in optical quality and homogeneity for these glasses. This is demonstrated in FIGS. 9A and 9B, where the $Ge_xAs_yS_{(100-x-y-z)}Se_z$ glass 82 produced from the process of the present invention (FIG. 9A) is clear when viewed with an infrared camera, while the glass 50 of the prior art (FIG. 9B) contains many refractive index perturbations 61.

EXAMPLE 4

Process of the Present Invention to Make Striae-Free $Ge_xAs_yS_{(100-x-y-z)}Se_z$ and Other Multicomponent Chalcogenide Glasses In this example, glass containing germanium, arsenic, selenium, and tellurium is fabricated without striae and without crystallite inclusions using the process described in Example 3 above with the main difference being the precursor elements and their quantities and the details of the heating schedule. Germanium, arsenic, selenium and tellurium precursors sufficient to constitute a glass with the composition of x % at. Ge, y % at. As, z % at. Se, and (100-x-y-z) % at. Te, where ($0 \leq x \leq 25$, $30 \leq x+y \leq 55$, and $0 \leq z \leq 20$) are loaded in a silica ampoule under an inert nitrogen gas atmosphere. The ampoule is then sealed using a methane/oxygen or hydrogen/oxygen torch and placed inside a rocking furnace with a ±45° angle of inclination and two independently controllable temperature zones where it is heated and rocked according to a glass melting schedule, an example of which is shown in Table 4 and described in more detail below. The bottom of the ampoule is placed at the center of the bottom zone such that the glass melt is entirely within the bottom zone.

In general, the steps in this example correspond to steps in the Example 3 but with different starting precursors and the times and temperatures used in the heating schedule.

TABLE 4

Glass melting schedule for a $Ge_xAs_ySe_zTe_{(100-x-y-z)}$ glass composition in a two-zone furnace using the present invention

| Step | Heating Rate (° C./min) | Temperature (° C.) Top Zone | Temperature (° C.) Bottom Zone | Dwell (hours) | Furnace Position |
|---|---|---|---|---|---|
| 1 | 3 | 650 | 650 | 1 | Horizontal 0° fixed |
| 2 | — | 650 | 650 | 15 | Rocking at ±45° inclination |
| 3 | +0.6 (T), −0.6 (B) | 750 | 650 | 1 | Rocking at ±45° inclination |
| 4 | — | 750 | 650 | 3 | Vertical 90° fixed. Fining. |
| 5 | −10.0 | 650 | 550 | 3 | Vertical 90° fixed. Fining. |
| 6 | −10.0 | 550 | 450 | 3 | Vertical 90° fixed. Fining. |
| 7 | −10.0 | 300 | 200 | 0.5 | Vertical 90° fixed. |
| 8 | | | Water quench | | |

Figure 10A:
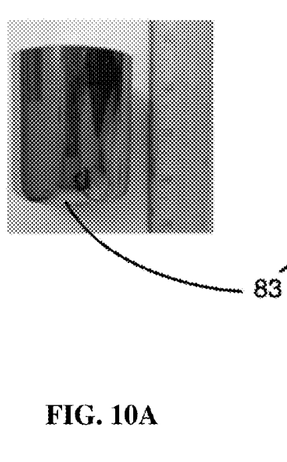
FIG. 10A is a photo of a 3.0 inches thick glass Ge$_x$As$_y$Se$_z$Te$_{(100-x-y-z)}$ ingot (83).
Figure 10B:
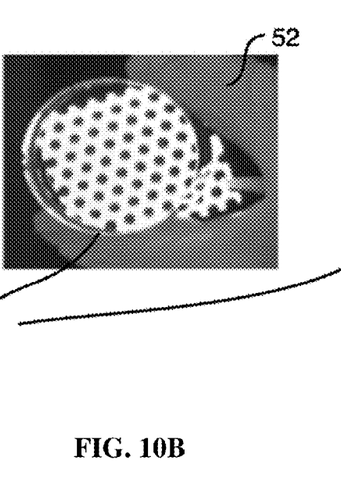
FIG. 10B shows an IR-image of a hot steel grating viewed through a 55 mm diameter, 3.0 inches thick Ge$_x$As$_y$Se$_z$Te$_{(100-x-y-z)}$ glass cylinder with both faces polished showing no striae in the uniform bulk glass.
Figure 10C:
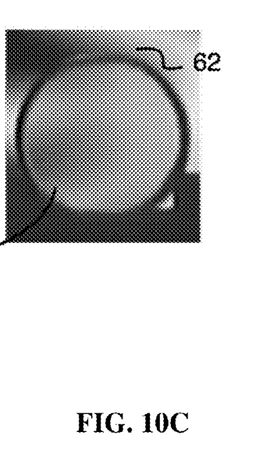
FIG. 10C shows an IR-image of a human hand and fingers viewed through a 55 mm diameter, 3.0 inches thick Ge$_x$As$_y$Se$_z$Te$_{(100-x-y-z)}$ glass cylinder with both faces polished showing no striae in the uniform bulk glass.

In Step 1, the top and bottom zones of the furnace are heated at a rate of 3° C./min from 20° C. (room temperature) to 650° C. (top) and 650° C. (bottom). In Step 2, the temperatures of the top zone (650° C.) and bottom zone (650° C.) are held constant for 15 hours while the furnace is rocked at an inclination angle of ±45° to facilitate mixing and homogenization of the elemental components. In Step 3, the top zone temperature is increased at a rate of 0.6° C./min to 750° C. and the bottom zone temperature is remained at 650° C. while the furnace is rocked at an inclination angle of ±45° to establish the temperature gradient of 100° C. between the top and bottom zones. In Step 4, the furnace motion is stopped and the furnace was set to a vertical position (90° fixed angle). This furnace position and temperature profile were held for 3 hours to facilitate fining and settling of the glass melt. In Step 5, the temperatures of the top zone and the bottom zone are reduced at a rate of 10.0° C./min to 650° C. (top) and 550° C. (bottom) and held for 3 hours. In Step 6, the temperatures of the top zone and the bottom zone are reduced at a rate of 10.0° C./min to 550° C. (top) and 450° C. (bottom) and held for 3 hours. In Step 7, the temperatures of the top zone and the bottom zone are reduced at a rate of 10.0° C./min to 300° C. (top) and 200° C. (bottom) and held for 0.5 hours. In Step 8, the hot ampoule is removed from the furnace, submerged in a room temperature water bath for 6 seconds to quench the glass melt forming a solid glass ingot. The ampoule containing the solid glass ingot is then placed in another furnace at 195° C. for 10 hours to anneal the solid glass and reduce stress due to quenching. FIGS. 10A-10C shows the results of this example. FIG. 10A shows a photo of a 3.0 inches thick glass $Ge_xAs_ySe_zTe_{(100-x-y-z)}$ ingot 83. FIG. 10B shows an IR-image of a hot steel grating 52 viewed through the 55 mm diameter, 3.0 inches thick $Ge_xAs_ySe_zTe_{(100-x-y-z)}$ glass cylinder 83 with both faces polished showing no striae in the uniform bulk glass. FIG. 10C shows a human hand and fingers 62 viewed through the 55 mm diameter, 3.0 inches thick $Ge_xAs_ySe_zTe_{(100-x-y-z)}$ glass cylinder 83 with both faces polished showing no striae in the uniform bulk glass.

This invention has been demonstrated using $Ge_xAs_yS_{(100-x-y-z)}Se_z$ and $Ge_xAs_ySe_zTe_{(100-x-y-z)}$ glasses in the above example but can also be applied to other two-component and multi-component chalcogenide glasses such as but not limited to, arsenic, sulfur, selenium and tellurium based glasses and other multi-component chalcogenide and chalcohalide glasses containing antimony, gallium aluminum, indium, bismuth, tin, iodine, bromine, chlorine, fluorine, lanthanum and other elements. The present invention could also be applied to the fabrication of other glasses (for example silicates, borates, fluorides, phosphates and others) or processing of viscous liquids (for example polymer melts, metals, salts and other liquids) where homogeneity is desired.

The above descriptions are those of the preferred embodiments of the invention. Various modifications and variations are possible in light of the above teachings without departing from the spirit and broader aspects of the invention. It is therefore to be understood that the claimed invention may be practiced otherwise than as specifically described. Any references to claim elements in the singular, for example, using the articles "a," "an," "the," or "said," is not to be construed as limiting the element to the singular.

What is claimed as new and desired to be protected by Letters Patent of the United States is:

1. A method to make striae-free chalcogenide glass, comprising:

loading chalcogenide glass precursors into an ampoule, sealing the ampoule, and placing the ampoule in a rocking furnace, wherein the rocking furnace comprises a top zone and a bottom zone, wherein the top and bottom zones are two independently controllable temperature zones;

heating both the top and bottom zones at a rate of 3° C. per minute to a Step 1 temperature, wherein the Step 1 temperature is the same for both the top and bottom zones;

maintaining the Step 1 temperature in the top and bottom zones while rocking the furnace at an inclination angle of ±45° for about 15 hours;

increasing the temperature of the top zone at a rate of 3° C. per minute to a Step 3 top zone temperature and decreasing the temperature of the bottom zone at a rate of 3° C. per minute to a Step 3 bottom zone temperature while rocking the furnace at an inclination angle of ±45°, wherein there is a temperature gradient of 100° C. between the Step 3 top zone temperature and the Step 3 bottom zone temperature;

setting the furnace to a vertical position and maintaining the Step 3 top zone temperature and the Step 3 bottom zone temperature for about 3 hours;

decreasing the temperature of the top zone at a rate of 10° C. per minute to a Step 5 top zone temperature, decreasing the temperature of the bottom zone at a rate of 10° C. per minute to a Step 5 bottom zone temperature, and maintaining the Step 5 top zone temperature and Step 5 bottom zone temperature for about 3 hours, wherein the Step 5 top zone temperature is about 100° C. lower than the Step 3 top zone temperature, and wherein the Step 5 bottom zone temperature is about 100° C. lower than the Step 3 bottom zone temperature;

decreasing the temperature of the top zone at a rate of 10° C. per minute to a Step 6 top zone temperature, decreasing the temperature of the bottom zone at a rate of 10° C. per minute to a Step 6 bottom zone temperature, and maintaining the Step 6 top zone temperature and Step 6 bottom zone temperature for about 3 hours, wherein the Step 6 top zone temperature is about 100° C. lower than the Step 5 top zone temperature, and wherein the Step 6 bottom zone temperature is about 100° C. lower than the Step 5 bottom zone temperature;

decreasing the temperature of the top zone at a rate of 10° C. per minute to a Step 7 top zone temperature, decreasing the temperature of the bottom zone at a rate of 10° C. per minute to a Step 7 bottom zone temperature, and maintaining the Step 7 top zone temperature and Step 7 bottom zone temperature for about 30 minutes, wherein the Step 7 top zone temperature is at least 100° C. lower than the Step 6 top zone temperature, and wherein the Step 7 bottom zone temperature is at least 100° C. lower than the Step 6 bottom zone temperature; and removing the ampoule from the furnace and water quenching the glass.

2. The method of claim 1, wherein the chalcogenide glass precursors comprise germanium, arsenic, sulfur, and selenium.

3. The method of claim 1, wherein the chalcogenide glass precursors are sufficient to constitute a glass with the composition of x % at. germanium, y % at. arsenic, z % at. selenium, and (100-x-y-z) % at. sulfur, wherein $0 \leq x \leq 10$, $30 \leq x+y \leq 45$, and $0 \leq z \leq 10$.

4. The method of claim 1, wherein the chalcogenide glass precursors are sufficient to constitute a glass with the composition of x % at. germanium, y % at. arsenic, z % at. selenium, and (100-x-y-z) % at. sulfur, wherein $0 \leq x \leq 25$, $30 \leq x+y \leq 55$, and $0 \leq z \leq 20$.

5. The method of claim 1, wherein the Step 1 temperature is about 680° C.

6. The method of claim 1, wherein the Step 1 temperature is about 650° C.

7. The method of claim 1, wherein the Step 3 top zone temperature is about 750° C. and the Step 3 bottom zone temperature is about 650° C.

8. The method of claim 1, wherein the Step 7 top zone temperature is about 450° C. and the Step 7 bottom zone temperature is about 350° C.

9. The method of claim 1, wherein the Step 7 top zone temperature is about 300° C. and the Step 7 bottom zone temperature is about 200° C.

\* \* \* \* \*